United States Patent [19]
Poot

[11] 3,773,448
[45] Nov. 20, 1973

[54] DOUGH DIVIDER
[76] Inventor: Pieter Poot, Uijterwaard 2, Heiloo, Netherlands
[22] Filed: Apr. 28, 1971
[21] Appl. No.: 138,242

[30] Foreign Application Priority Data
Apr. 29, 1970 Netherlands .................. 7007651

[52] U.S. Cl. .................. 425/93, 425/96, 425/239, 425/241
[51] Int. Cl. ............................................. A21c 5/00
[58] Field of Search ............... 425/93, 96, 98, 238, 425/239, 241, 101, 102, 202, 209, 227, 107, 425/206

[56] References Cited
UNITED STATES PATENTS
| | | | |
|---|---|---|---|
| 888,412 | 5/1908 | Thomson | 425/96 |
| 938,051 | 10/1909 | Gowdy | 425/241 |
| 1,019,556 | 3/1912 | Teichman | 425/241 |
| 815,896 | 3/1906 | Ahrweiler | 425/93 X |
| 1,131,329 | 3/1915 | Callow | 425/102 |
| 2,656,797 | 10/1953 | Chambon | 425/96 |
| 1,314,170 | 8/1919 | Van Hooten | 425/93 |

FOREIGN PATENTS OR APPLICATIONS
245,926   8/1908   Germany

*Primary Examiner*—J. Spencer Overholser
*Assistant Examiner*—David S. Safran
*Attorney*—Cantor and Kraft

[57] ABSTRACT

A dough dividing machine with a rotor having radially extending blades movable into and out of the rotor to sever metered quantities of dough supplied to the machine. The blades and the rotor slots receiving them are provided with a lubricant before engaging the dough, preferably the blades are immersed in an oil bath during an idle period.

4 Claims, 1 Drawing Figure

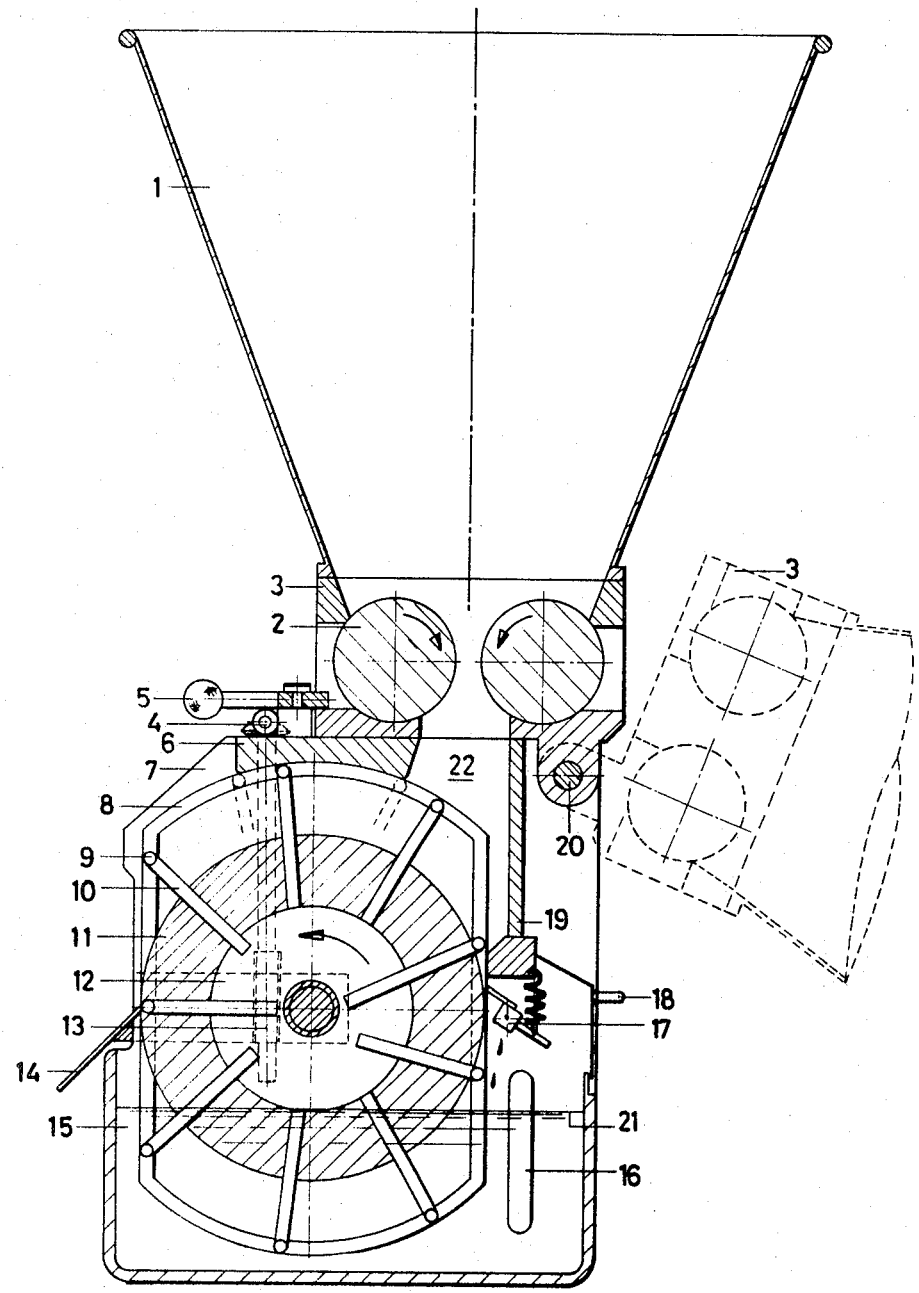

DOUGH DIVIDER

This invention relates to a dough dividing machine.

This invention is concerned with a dough dividing machine of the kind described in German Pat. specification No. 245,926, and comprises a housing, dough supply means, and a rotor having blades movable therein in a substantially radial direction, the blades being moved into and out of the rotor by control means so that metering chambers are formed by two protracted blades in co-operation with a sector of the rotor and a portion of the wall of the housing, the filled metering chambers being rotated by the rotor to an outlet in the housing, where the metered quantity of dough is removed from the rotor while the control means retract the blades, the machine further comprising lubricating means. The machine described in the aforementioned German specification is relatively heavy and structurally complicated. In fact, the radial movements of the blades are controlled by a system of camming surfaces and springs, while for lubricating purposes, namely, for providing the blades with a layer of dough-release agent, means are provided for continuously dusting the rotor surface with flour. It is especially the flour dusting principle which constitutes a poor and inadequate solution for the problems concomitant in dough processing, dough being notorious for its tendency to stick, for example, to the blades, where it hardens and will then interfere with the smooth operation of the machine. Moreover, in the prior machine the rotor is dusted so that the surface of the blades proper to not reached, namely at the moment when the blades are retracted within the rotor. The blade receiving slots in the rotor are not reached by the release agent either, so that any dough particles which are taken along by the blades can deposit and accumulate within the slots.

It is an object of the present invention to provide a dough dividing machine of the kind described wich is of simple construction and which provides efficient lubrication of those parts of the machine which need it most, such as the blade receiving slots in the rotor, so as to minimize the accumulation of dough therein.

According to the invention, there is provided a dough dividing machine comprising a housing, dough supply means, and a rotor having blades movable therein in a substantially radial direction, the blades being moved into and out of the rotor by control means so that metering chambers are formed periodically by two protracted blades in co-operation with a sector of the rotor and a portion of the wall of the housing, the filled metering chambers being rotated by the rotor to an outlet of the housing, where a metered quantity of dough is removed from the rotor while the control means retract the blades, the machine further comprising lubricating means, characterized in that the control means are arranged to protract the blades retracted for the discharge of a metered quantity of dough, and retract the blades again before the latter engage a fresh quantity of dough, but after they have been covered with a lubricant.

It should be noted that the term lubricant as used herein and in the accompanying claims is intended to cover lubricants, such as oil, and also other cleansing or dough-releasing agents.

In a preferred embodiment of the invention, the control means guide the blades through an oil bath.

In the machine according to the present invention, not only are the blades fully covered with a film of oil or other dough release agent before being pushed into the dough for separating a metered quantity therefrom, but because they have been previously withdrawn into the rotor, the clearance between the walls of the blade-receiving slots in the rotor and the blades is filled with oil. This prevents the penetration of any dough which may still adhere to the blades. Furthermore, if any small quantities of dough should find their way into the slots, the oil will prevent such dough from becoming hardened. The dough, which is thus maintained in a soft condition, can be removed during the next immersion of the blades in the oil bath.

The control means for projecting the blades during the oiling operation may take the form of guide grooves formed in the walls of the machine housing, and projections on the outer ends of the blades, received in such grooves. This embodiment of the control means is extremely simple, efficient, and reliable, it being possible to realize any desired number and kind of blade movement by a suitable selection of the configuration of the grooves.

Furthermore, in the dough divider as described in German Pat. specification No. 245.926, the rotor and the housing are so disposed, relative to each other, that the dough is forced into a converging channel, it being ensured, in co-operation with pressure equalizing means in the form of pivoting parts of the housing and a pressure regulator, that the metering chamber is always filled with a volume of dough under the same pressure, so that the dispensed metered volumes of dough always have the same weight. The disadvantage of such a control of the density of the dough in the metering cavity, apart from the complicated construction of the device, is that the dough is subjected to strangling forces, which adversely affect its quality.

A further object of the present invention, therefore, is to overcome or alleviate the above-mentioned disadvantage, and to this end a machine according to the present invention may include means for controlling the density of the dough in the metering chamber, which means comprises a set of driven rollers, an extruder, or like means for supplying dough under pressure from a funnel to a compartment which is thereby constantly filled with dough, which compartment is at least partly located in the path of the blades lubricated in the oil bath. Owing to the fact that the blades withdraw the dough from a space in which it is maintained under a given pressure, the metering chamber constituted by a sector of the rotor, two blades, and a segment of the housing is at all times optimally filled with dough under the desired pressure. It is therefore not necessary for the channel between the wall of the housing and the rotor to converge in the direction of discharge of the dough. Consequently, the curvature of the wall portion of the housing adjacent to the metering chamber may be equal to that of the rotor sector.

Further, according to the present invention, the pressure of the dough may be utilized for driving the rotor. For this purpose the rotor may, for example, be journalled in the housing of the machine for free rotation.

One embodiment of the invention will be described, by way of example, with reference to the accompanying diagrammatic drawing, which shows a vertical section of a machine according to the invention.

Referring to the drawing, there is shown a dough dividing machine comprising a funnel 1, which terminates in a bearing housing 3 for feed rollers 2. The rollers are arranged to supply dough under pressure to a compartment 22 in the housing of the machine, defined by a removable rear wall 19, a housing segment 6, and a sector of a rotor 11. Rotor 11 is journalled in the housing by means of two bearing blocks 12, which are vertically adjustable by means of spindles 13 and a set screw 4 on top of the housing. Rotor 11 is provided with blades 10 radially movable therein and provided at their radially outward ends with lateral projections 9, which are received in guide grooves 8 in respective side plates 7 of the machine housing. Also mounted on bearing blocks 12, on the delivery side of the machine, is a scraper blade 14, which is adjustable up and down in the housing together with the rotor.

Provided at the bottom of the housing is an oil sump 15, the level 21 of the oil being indicated by a gauge glass 16. There is also provided an oil scraper 17. Oil can be replenished through a cover 18 in the housing. The funnel together with the feed rollers 2 can be moved relative to the housing to give access thereto. For this purpose, the bearing housing 3 for the rollers is pivoted to the machine housing by means of a shaft 20, and is locked in the operative position, as shown in full lines by means of a knob 5. In operation, dough present in the funnel 1 is forced by rollers 2 into compartment 22 of the machine housing. The blades 10 of rotor 11, which rotates in the direction of the arrow, penetrate into the dough supplied to compartment 22 under pressure, and pinch off the dough at housing segment 6. In this metering chamber, the size of which can be varied by vertical adjustment of the rotor, the dough is under the same pressure generated by feed rollers 2 in compartment 22. During further transport to the delivery side of the machine, the leading blade 10 of a pair of successive blades is pushed back into the rotor, under the control of guide groove 8 and projections 9, and is fully retracted within the rotor at the position of scraper blade 14, which can lift the metered quantity of dough from the oiled rotor.

After passing the scraper, the blade again emerges radially from the rotor for oiling, and is immersed in the oil in sump 15. After being moistened with oil is again retracted, so that a smooth rotor surface is presented to oil scraper 17, and the blade receiving slot of the rotor is oiled as well.

The blade thus oiled is again pulled out of the now oiled rotor and pressed into the quantity of dough maintained under pressure by rollers 2.

It will be clear that the dough divider according to the invention ensures full lubrication of the blades and the blade receiving slots, which are most apt to become contaminated with dough. The machine is structurally simple, and occupies little space compared with prior machines.

I claim:

1. A dough dividing machine comprising a housing; dough supply means; a rotor having blades movable therein in a substantially radial direction; control means for moving said blades into and out of said rotor to periodically form metering chambers by two projecting blades in cooperation with a sector of the rotor and a portion of the wall of the housing, said metering chambers being rotated by the rotor from a first position wherein dough is charged to the same from said dough supply means to a second position wherein said dough is discharged through an outlet in said housing; said control means retracting the blades when said chambers are in said second position, and reprojecting the blades after discharge of a metered quantity of dough; and means for applying oil to said blades when they are re-projected; said control means further retracting the blades after application of oil thereto, and projecting the blades to form said metering chambers during one cycle of rotation of the rotor.

2. A dough dividing machine comprising a housing; dough supply means; a rotor having blades movable therein in a substantially radial direction; control means for moving said blades into and out of said rotor to periodically form metering chambers by two projecting blades in cooperation with a sector of the rotor and a portion of the wall of the housing, said metering chambers being rotated by the rotor from a first position wherein dough is charged to the same from said dough supply means to a second position wherein said dough is discharged through an outlet in said housing; said control means being arranged to retract the blades when said chambers are in said second position; and lubricating means; said control means further being arranged to project the blades after discharge of a metered quantity of dough for application of lubricant by said lubricating means to said blades, retract the blades again, and project the blades to form said metering chambers, said lubricating means comprising an oil bath.

3. A dough dividing machine according to claim 1, wherein the dough is supplied to the machine under pressure thereby comprising driving means for said rotor.

4. A dough dividing machine according to claim 1, further comprising means for controlling the density of the dough, said last-mentioned means comprising a compartment constantly filled with dough, said compartment being at least partly located in the path of said blades, and means for supplying dough under pressure to said compartment.

* * * * *